United States Patent
Huang et al.

(10) Patent No.: US 10,735,761 B2
(45) Date of Patent: Aug. 4, 2020

(54) METHOD AND APPARATUS OF VIDEO CODING

(71) Applicant: MEDIATEK INC., Hsinchu (TW)

(72) Inventors: Han Huang, San Jose, CA (US);
Xiaozhong Xu, State College, PA (US);
Tzu-Der Chuang, Zhubei (TW)

(73) Assignee: MEDIATEK INC, Hsinchu (TW)

( * ) Notice: Subject to any disclaimer, the term of this patent is extended or adjusted under 35 U.S.C. 154(b) by 14 days.

(21) Appl. No.: 15/966,570

(22) Filed: Apr. 30, 2018

(65) Prior Publication Data

US 2018/0338154 A1 Nov. 22, 2018

Related U.S. Application Data

(60) Provisional application No. 62/508,463, filed on May 19, 2017.

(51) Int. Cl.
*H04N 19/517* (2014.01)
*H04N 19/56* (2014.01)
(Continued)

(52) U.S. Cl.
CPC ......... *H04N 19/517* (2014.11); *H04N 19/105* (2014.11); *H04N 19/176* (2014.11); *H04N 19/56* (2014.11); *H04N 19/57* (2014.11)

(58) Field of Classification Search
CPC ...... H04N 19/517; H04N 19/56; H04N 19/57; H04N 19/176; H04N 19/105
See application file for complete search history.

(56) References Cited

U.S. PATENT DOCUMENTS

| 2004/0052507 A1* | 3/2004 | Kondo | H04N 19/172 |
| | | | 386/329 |
| 2004/0234143 A1* | 11/2004 | Hagai | H04N 19/105 |
| | | | 382/238 |

(Continued)

FOREIGN PATENT DOCUMENTS

| CN | 103314593 A | 9/2013 |
| CN | 106471811 A | 3/2017 |

OTHER PUBLICATIONS

Combined Office Action and Search Report dated Aug. 27, 2019 in Taiwanese Patent Application No. 107115051, 11 pages (with English translation of categories of cited references).

(Continued)

*Primary Examiner* — Anner N Holder
*Assistant Examiner* — Jill D Sechser
(74) *Attorney, Agent, or Firm* — Oblon, McClelland, Maier & Neustadt, L.L.P.

(57) ABSTRACT

Aspects of the disclosure include a video decoding device that includes a processing circuit. The processing circuit is configured to receive encoded video data associated with a current block of a current image frame, determine a set of candidate motion vectors for the current block, determine a selection index based on the encoded video data, and select one of the set of candidate motion vectors based on the selection index. The processing circuit is further configured to refine the selected candidate motion vector to become a reconstructed motion vector when the selected candidate motion vector meets a predetermined condition, and generate an image of the current image frame for output, including generating a reconstructed image of the current block based on the reconstructed motion vector.

19 Claims, 7 Drawing Sheets

(51) Int. Cl.
*H04N 19/57* (2014.01)
*H04N 19/105* (2014.01)
*H04N 19/176* (2014.01)

(56) References Cited

U.S. PATENT DOCUMENTS

| | | | |
|---|---|---|---|
| 2011/0135285 A1* | 6/2011 | Imanaka | H04N 19/52 |
| | | | 386/328 |
| 2013/0287113 A1* | 10/2013 | Gisquet | H04N 19/139 |
| | | | 375/240.16 |
| 2014/0286427 A1* | 9/2014 | Fukushima | H04N 19/105 |
| | | | 375/240.16 |
| 2015/0382012 A1* | 12/2015 | Hussain | H04N 19/56 |
| | | | 375/240.16 |
| 2016/0286229 A1* | 9/2016 | Li | H04N 19/513 |

OTHER PUBLICATIONS

Li, M. et al. "Low-Complexity Merge Candidate Decision for Fast HEVC encoding" 2013 IEEE International Conference on Multimedia and Expo Workshops (ICMEW), 2013, 6 pages.

\* cited by examiner

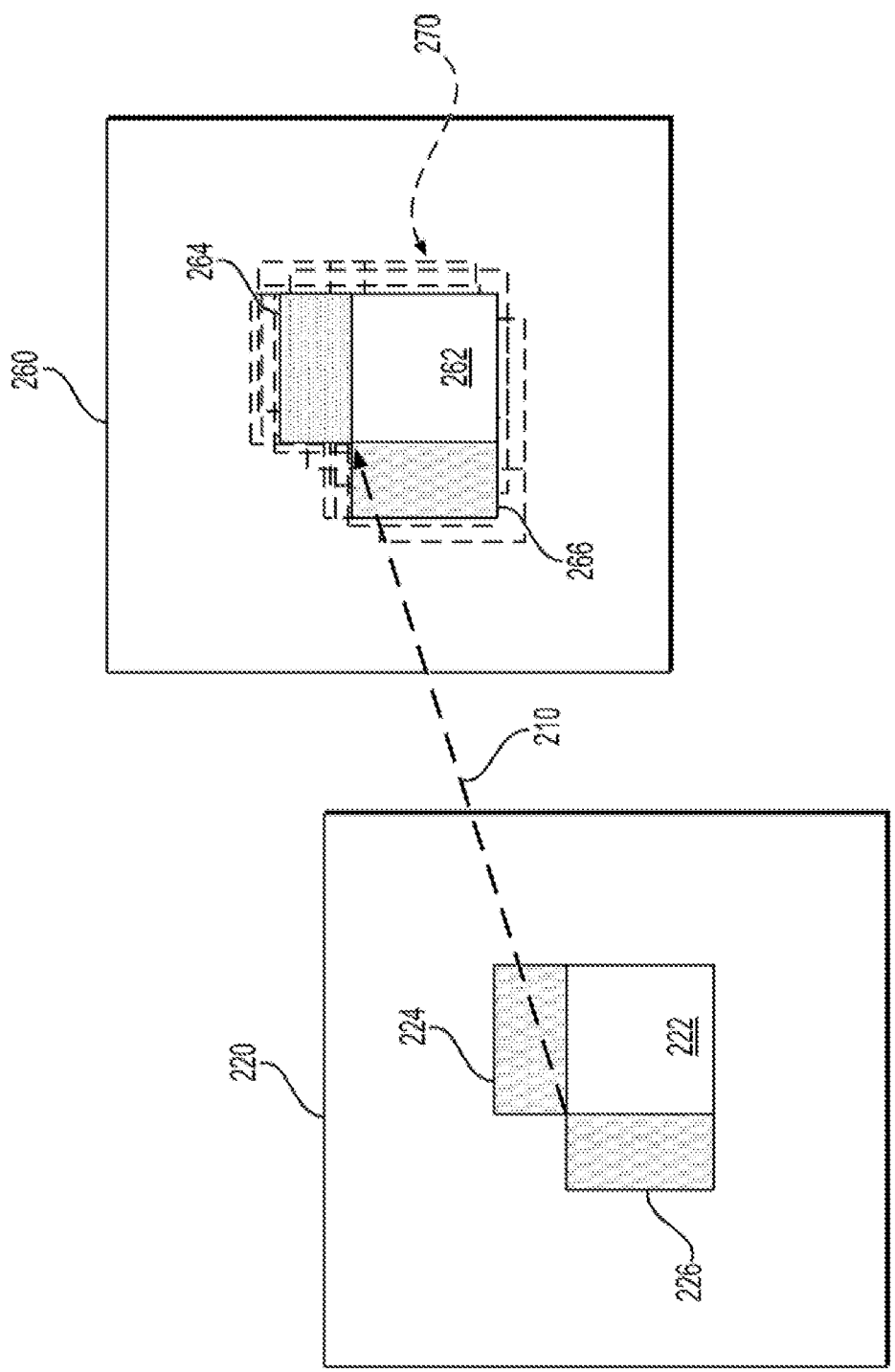

METHOD AND APPARATUS OF VIDEO CODING

INCORPORATION BY REFERENCE

This present disclosure claims the benefit of U.S. Provisional Application No. 62/508,463, "Methods and apparatus of advance motion vector prediction" filed on May 19, 2017, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Many video coding standards divide an image frame of an input video into one or more coding units (or blocks) that correspond to luma or chroma components of the image frame. When encoding an original image of a block, the original image of the block can be divided into a predictable portion (also referred to as a predictor) and a residual portion of the block according to a predetermined video coding standard. When decoding the block, a reconstructed image of the block can be obtained by generating and combining the predictor and the residual portion of the block according to the same predetermined video coding standard.

In some applications, the predictor of a block can be generated based on the image(s) of other blocks and/or other frames referenced according to one or more motion vectors. Such prediction scheme may reduce temporal redundancy in the encoded video data and is also known as an inter prediction. In some applications, the predictor of a block can be generated by extrapolating samples of neighboring pixels based on a selected one of plural predetermined prediction modes. Such prediction scheme may reduce spatial redundancy in the encoded video data and is also known as an intra prediction.

SUMMARY

Aspects of the disclosure provide a video decoding device that includes a processing circuit. The processing circuit is configured to receive encoded video data associated with a current block of a current image frame, determine a set of candidate motion vectors for the current block, determine a selection index based on the encoded video data, and select one of the set of candidate motion vectors based on the selection index. The processing circuit is further configured to refine the selected candidate motion vector to become a reconstructed motion vector when the selected candidate motion vector meets a predetermined condition, and generate an image of the current image frame for output, including generating a reconstructed image of the current block based on the reconstructed motion vector.

In an embodiment, the set of candidate motion vectors includes two or more identical candidate motion vectors that correspond to two or more respective indices, and the processing circuit is further configured to refine the selected candidate motion vector to become the reconstructed motion vector when the selection index corresponds to a predetermined ordinal rank among the two or more indices of the two or more identical candidate motion vectors.

In an embodiment, the predetermined ordinal rank corresponds to a smallest index among the two or more indices of the two or more identical candidate motion vectors. In an embodiment, the predetermined ordinal rank corresponds to a second-smallest index among the two or more indices of the two or more identical candidate motion vectors.

In an embodiment, the processing circuit is further configured to skip refining the selected candidate motion vector when the selection index does not correspond to the predetermined ordinal rank.

In an embodiment, the processing circuit is configured to refine the selected candidate motion vector to become the reconstructed motion vector when the selected candidate motion vector is different from any other motion vector of the set of candidate motion vectors.

In an embodiment, the processing circuit is configured to determine the set of candidate motion vectors for the current block based on motion information of at least one spatially adjacent block and/or at least one temporally adjacent block of the current block. In an embodiment, the set of candidate motion vectors includes at most two candidate motion vectors.

In an embodiment, the processing circuit is configured to refine the selected candidate motion vector by identifying sample motion vectors based on the selected candidate motion vector using a diamond search pattern or a cross search pattern, performing template evaluations for the identified sample motion vectors, and selecting one of the identified sample motion vectors as a refinement of the selected candidate motion vector based on the template evaluations.

In an embodiment, the identified sample motion vectors indicate reference positions in a reference image that are within a predetermined search range from a reference position indicated by the selected candidate motion vector.

Aspects of the disclosure can provide a video decoding method that includes receiving encoded video data associated with a current block of a current image frame, determining a set of candidate motion vectors for the current block, determining a selection index based on the encoded video data, and selecting one of the set of candidate motion vectors based on the selection index. The method further includes refining, by a processing circuit, the selected candidate motion vector to become a reconstructed motion vector when the selected candidate motion vector meets a predetermined condition, and generating, by a processing circuit, an image of the current image frame for output, including generating a reconstructed image of the current block based on the reconstructed motion vector.

In an embodiment, the set of candidate motion vectors includes two or more identical candidate motion vectors that correspond to two or more respective indices, and the method further includes refining, by the processing circuit, the selected candidate motion vector to become the reconstructed motion vector when the selection index corresponds to a predetermined ordinal rank among the two or more indices of the two or more identical candidate motion vectors.

Aspects of the disclosure provide a video encoding device that includes a processing circuit. The processing circuit is configured to receive a current image frame that includes a current block, determine a set of initial motion vectors for the current block, and determine a set of candidate motion vectors for the current block based on the set of initial motion vectors, including refining one or more initial motion vectors that meet a predetermined condition to become one or more respective candidate motion vectors. The processing circuit is further configured to select a candidate motion vector from the set of candidate motion vectors for the current block, and encode the current image frame for output, including encoding an image of the current block based on the selected candidate motion vector.

In an embodiment, the set of initial motion vectors includes two or more identical initial motion vectors that correspond to two or more respective indices, and the processing circuit is further configured to refine one of the two or more identical initial motion vectors that corresponds to a predetermined ordinal rank among the two or more indices of the two or more identical candidate motion vectors, and skip refining at least another one of the two or more identical initial motion vectors.

In an embodiment, the predetermined ordinal rank corresponds to a smallest index among the two or more indices of the two or more identical initial motion vectors. In an embodiment, the predetermined ordinal rank corresponds to a second-smallest index among the two or more indices of the two or more identical initial motion vectors.

In an embodiment, the processing circuit is further configured to refine each initial motion vector when all of the one or more initial motion vectors are different.

In an embodiment, the processing circuit is configured to determine the set of initial motion vectors for the current block based on motion information of at least one spatially adjacent block and/or at least one temporally adjacent block of the current block. In an embodiment, the set of initial motion vectors includes at most two initial motion vectors.

In an embodiment, the processing circuit is configured to refine a particular initial motion vector by identifying sample motion vectors based on the particular initial motion vector using a diamond search pattern or a cross search pattern, performing template evaluations for the identified sample motion vectors, and selecting one of the identified sample motion vectors as a refinement of the particular initial motion vector based on the template evaluations.

In an embodiment, the identified sample motion vectors indicate reference positions in a reference image that are within a predetermined search range from a reference position indicated by the selected candidate motion vector.

Aspects of the disclosure can provide a video encoding method that includes receiving a current image frame that includes a current block, determining a set of initial motion vectors for the current block, and determining, by a processing circuit, a set of candidate motion vectors for the current block based on the set of initial motion vectors, including refining one or more initial motion vectors that meet a predetermined condition to become one or more respective candidate motion vectors. The method further includes selecting a candidate motion vector from the set of candidate motion vectors for the current block, and encoding, by the processing circuit, the current image frame for output, including encoding an image of the current block based on the selected candidate motion vector.

In an embodiment, the set of initial motion vectors includes two or more identical initial motion vectors that correspond to two or more respective indices, and the method further includes refining, by the processing circuit, one of the two or more identical initial motion vectors that corresponds to a predetermined ordinal rank among the two or more indices of the two or more identical candidate motion vectors, and skipping refining at least another one of the two or more identical initial motion vectors.

BRIEF DESCRIPTION OF THE DRAWINGS

Various embodiments of this disclosure that are proposed as examples will be described in detail with reference to the following figures, wherein like numerals reference like elements, and wherein:

FIG. 2 shows a diagram illustrating refining a motion vector according to an exemplary embodiment of the disclosure;

DETAILED DESCRIPTION OF EMBODIMENTS

In accordance with some examples of the present disclosure, when encoding a current block using inter prediction, a set of candidate motion vectors can be determined based on refining a portion or all of a set of initial motion vectors. Also, when decoding the current block using inter prediction, motion vector refinement can be applied only to a selected candidate motion vector. According to some examples of the present disclosure, the overall coding efficiency for the current block can be improved by using a refined motion vector. Also, according to some examples of the present disclosure, the computational complexity for decoding the current block can be reduced, because at most one motion vector is subject to motion vector refinement.

Figure 1:
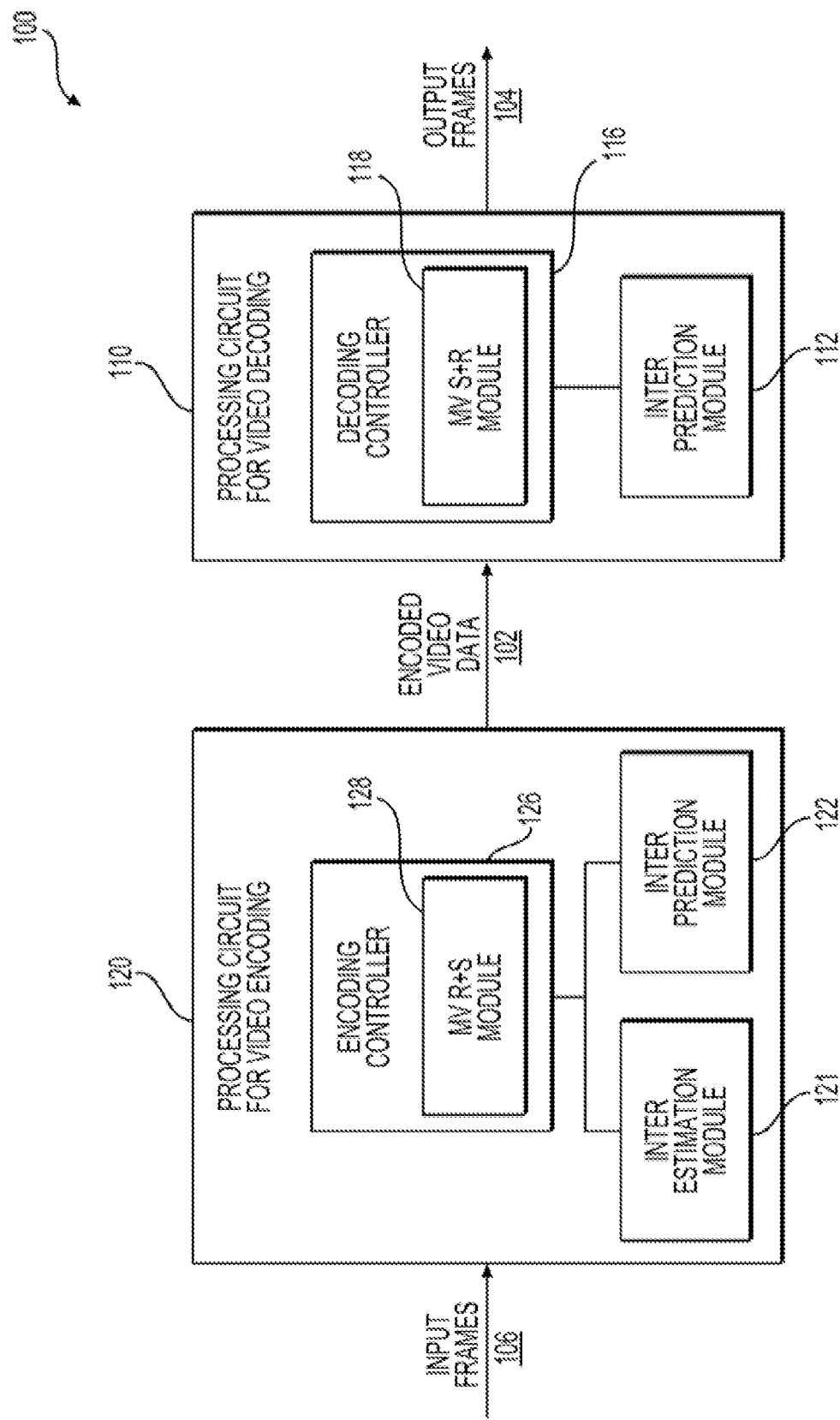
FIG. 1 shows an exemplary functional block diagram of a video coding system according to an embodiment of the disclosure.

FIG. 1 shows an exemplary functional block diagram of a video coding system 100 according to an embodiment of the disclosure. The video coding system 100 includes a processing circuit for video decoding (i.e., a decoding circuit) 110 and a processing circuit for video encoding (i.e., an encoding circuit) 120. The encoding circuit 120 receives input frames 106 as input data and generates encoded video data 102 by encoding the input frames 106. The decoding circuit 110 receives the encoded video data 102 as input data and generates output frames 104 by decoding the encoded video data 102. The video coding system 100 may be implemented by one or more video coding devices that can include the decoding circuit 110, the encoding circuit 120, or both the decoding circuit 110 and encoding circuit 120.

The decoding circuit 110 can include at least an inter prediction module 112 and a decoding controller 116. The inter prediction module 112 can generate a predictor of a block (e.g., a current block) in an image frame based on a reconstructed motion vector for the block. The decoding controller 116 can oversee the decoding of the encoded video data 102, including determining whether to use the inter prediction module 112 to decode the current block.

The decoding controller 116 includes a motion vector select-and-refine (MV S+R) module 118 that is configured to determine a set of candidate motion vectors for the current block, to select one of the set of candidate motion vectors based on a selection index, and to refine the selected candidate motion vector when the selected candidate motion vector meets a predetermined condition. In one example, the MV S+R module 118 can refine the selected candidate motion vector when the selected candidate motion vector is different from any other motion vector of the set of candidate motion vectors.

In operation, the decoding controller 116 receives the encoded video data 102 associated with the current block and extracts information therefrom regarding whether to use the inter prediction module 112 and/or information for reconstructing the motion vector for the current block. In some examples, the information for reconstructing the motion vector for the current block includes a mode indicator indicating how to obtain the reconstructed motion vector for the current block. In some examples, the reconstructed motion vector for the current block is to be obtained by determine a set of candidate motion vectors based on the motion information from spatially adjacent and/or temporally adjacent blocks, and the information for reconstructing the motion vector for the current block includes a selection index indicating which motion vector in the set of candidate motion vectors is to be used to determine the reconstructed motion vector for the current block. In at least one example, the mode indicator and/or the selection index can be derived by the decoding controller 116 without explicitly including the same in the encoded video data 102.

Based on the encoded video data 102, the MV S+R module 118 can determine a set of candidate motion vectors according to a predetermined motion vector prediction process, such as an Advanced Motion Vector Prediction (AMVP) mode or a Merge mode, or any other suitable motion vector prediction process. In some examples, the predetermined motion vector prediction process is performed based on the motion information from spatially adjacent and/or temporally adjacent blocks, which can include unrefined motion vectors, refined motion vectors, or both, according to a predetermined video coding standard. In some examples, the predetermined motion vector prediction process includes a pruning process to remove duplicated candidate motion vectors, or to remove one of two candidate motion vectors that are within a predetermined threshold. In some examples, the predetermined motion vector includes a default-adding process to add a zero motion vector or a default motion vector to the set of candidate motion vectors. In at least one example, the set of candidate motion vectors includes at most two candidate motion vectors.

Also, based on the encoded video data 102, the MV S+R module 118 decodes or derives a selection index for selecting a candidate motion vector from the set of candidate motion vectors. The MV S+R module 118 can further determine the reconstructed motion vector for the current block based on the selected candidate motion vector, including refining the selected candidate motion vector when a predetermined condition is satisfied.

In one example, the MV S+R module 118 can be configured to always refine the selected candidate motion vector to become the reconstructed motion vector. In another example, the MV S+R module 118 can be configured to refine the selected candidate motion vector when the selected candidate motion vector is different from any other motion vector of the set of candidate motion vectors.

In a case that the set of candidate motion vectors includes two or more identical candidate motion vectors that correspond to two or more respective indices, the MV S+R module 118 can be configured to refine the selected candidate motion vector when the selection index corresponds to a predetermined ordinal rank among the two or more indices of the two or more identical candidate motion vectors. In some examples, the predetermined ordinal rank corresponds to a smallest index among the two or more indices of the two or more identical candidate motion vectors. In some examples, the predetermined ordinal rank corresponds to a second-smallest index among the two or more indices of the two or more identical candidate motion vectors. In yet some other examples, a predetermined portion of the set of candidate motion vectors can be subject to refinement or free from refinement according a predetermine video coding standard that the encoded video data 102 complies.

For example, according to an exemplary video coding standard, the MV S+R module 118 can create a set of candidate motion vectors that includes two candidate motion vectors: $MVP_0$ associated with index 0 and $MVP_1$ associated with index 1. When the candidate motion vectors $MVP_0$ and $MVP_1$ are different, according to the exemplary video coding standard, the MV S+R module 118 can refine the selected candidate motion vector to become the reconstructed motion vector. When the candidate motion vectors $MVP_0$ and $MVP_1$ are the same, according to the exemplary video coding standard, the MV S+R module 118 can refine the selected candidate motion vector to become the reconstructed motion vector for the current block when the selected candidate motion vector is a predetermined one of $MVP_0$ and $MVP_1$. For example, the MV S+R module 118 can be configured such that, if the selection index is 0, candidate motion vector $MVP_0$ is selected and refined to become the reconstructed motion vector; and if the selection index is 1, candidate motion vector $MVP_1$ is selected and output as the reconstructed motion vector without refinement. Of course, the MV S+R module 118 can be alternatively configured such that, if the selection index is 1, candidate motion vector $MVP_1$ is selected and refined to become the reconstructed motion vector; and if the selection index is 0, candidate motion vector $MVP_0$ is selected and output as the reconstructed motion vector without refinement.

Furthermore, when a selected candidate motion vector is subject to be refined to become the reconstructed motion vector, the MV S+R module 118 can refine the selected candidate motion vector by identifying sample motion vectors based on the selected candidate motion vector using a predetermined search pattern with a predetermined step size. The predetermined search pattern can be a diamond search pattern or a cross search pattern. The predetermined step size can be measurable in unit of pixel pitch, which can be an integer or a fraction of a pixel pitch of the current block in some examples. The MV S+R module 118 can perform template evaluations for the identified sample motion vectors, and then select one of the identified sample motion vectors as a refinement of the selected candidate motion vector based on the template evaluations. In some examples, the MV S+R module 118 can refine the selected candidate motion vector using different search patterns in a predetermined number of iterations. When the refinement is performed using a step size of a fractional pixel pitch, the sample motion vector and corresponding template can be obtained by interpolation. Also, in some examples, the identified sample motion vectors are limited to those that indicate reference positions in a reference image that are within a predetermined search range from a reference position indicated by the selected candidate motion vector. In some examples, the search range can be limited to 8 pixel pitches of the current image or 8 pixel pitches of a luma image corresponding to the current image.

For example, according to an exemplary video coding standard, the MV S+R module 118 can refine the selected candidate motion vector by performing template matching according to a diamond search pattern and then another template matching according to a cross search pattern with a predetermined step size, and then repeating template matching using these search patterns for a predetermined number of iteration with a decreased step size. In another example, according to another exemplary video coding standard, the MV S+R module 118 can refine the selected candidate motion vector by performing template matching according to a diamond search pattern and then according to a cross search pattern with a step size of an integer pixel pitch, such as one or two pixel pitches. In yet another example, according to yet another exemplary video coding standard, the MV S+R module 118 can refine the selected candidate motion vector by performing template matching according to a diamond search pattern and then according to a cross search pattern with a step size of a fractional pixel pitch, such as a quarter or a half of pixel pitch. Of course, the selected candidate motion vector can be refined based on other motion vector refinement approaches.

After the MV S+R module 118 determined the reconstructed motion vector for the current block, the inter prediction module 112 generates a predictor of the current block according to the reconstructed motion vector, and the decoding controller 116 controls the operation of the decoding circuit 110 to decode and generate output frames 104 based on at least the predictor of the current block.

The encoding circuit 120 can include at least an inter estimation module 121, an inter prediction module 122, and an encoding controller 126. The inter estimation module 121 can analyze the input frames 106 and determine prediction parameters for encoding a block (or a current block) in an image frame using an inter prediction based on a set of candidate motion vectors and a predetermined cost function. In some examples, the prediction parameters include a motion vector selected from the set of candidate motion vectors provided by the encoding controller 126. In some examples, the predetermined cost function includes a rate-distortion optimization analysis. The inter prediction module 122 can generate a predictor of the current block based on the selected candidate motion vector for the block provided by the inter estimation module 121 or the encoding controller 126. The encoding controller 126 can oversee the encoding of the current block, including determining whether to use the inter estimation module 121 and the inter prediction module 122 to encode the current block and/or controlling the operation of the inter estimation module 121 and the inter prediction module 122.

The encoding controller 126 includes a motion vector refine-and-select (MV R+S) module 128 that is configured to determine a set of initial motion vectors for the current block, to determine a set of candidate motion vectors for the current block based on the set of initial motion vectors, including refining one or more initial motion vectors that meet a predetermined condition to become one or more respective candidate motion vectors. In one example, the MV R+S module 128 can refine the initial motion vectors in the set of initial motion vectors that are different from one another to become one or more respective candidate motion vectors.

In operation, the encoding controller 126 can generate the encoded video data 102 associated with the current block by including information regarding whether to use the inter prediction and/or information for reconstructing a motion vector for the current block. In some examples, the information for reconstructing the motion vector for the current block includes a mode indicator and/or a selection index for obtaining the reconstructed motion vector for the current block when decoding.

Based on a predetermined video coding standard, the MV R+S module 128 can determine a set of initial motion vectors according to a predetermined motion vector prediction process, such as an Advanced Motion Vector Prediction (AMVP) mode or a Merge mode, or any other suitable motion vector prediction process. In some examples, the predetermined motion vector prediction process is performed based on the motion information from spatially adjacent and/or temporally adjacent blocks, which can include unrefined motion vectors, refined motion vectors, or both, according to a predetermined video coding standard. In some examples, the predetermined motion vector prediction process includes a pruning process to remove duplicated initial motion vectors or to remove one of two initial motion vectors that are within a predetermined threshold. In some examples, the predetermined motion vector includes a default-adding process to add a zero motion vector or a default motion vector to the set of initial motion vectors. In at least one example, the set of initial motion vectors includes at most two initial motion vectors.

The MV R+S module 128 can further converting the set of initial motion vectors to become a set of candidate motion vectors. In some examples, the MV R+S module 128 generates the set of candidate motion vectors by refining a portion or all of the set of initial motion vectors that meet a predetermined condition.

In one example, the MV R+S module 128 can be configured to refine all initial motion vectors to become the set of candidate motion vectors. In another example, the MV R+S module 128 can be configured to refine one or more initial motion vectors that are different from one another to become one or more respective candidate motion vectors, while keeping the other initial motion vectors in the set of candidate motion vectors without refinement.

In a case that the set of initial motion vectors includes two or more identical initial motion vectors that correspond to two or more respective indices, the MV R+S module 128 can be configured to refine one of the two or more identical initial motion vectors that corresponds to a predetermined ordinal rank among the two or more indices of the two or more identical initial motion vectors, and to skip refining at least another one of the two or more identical initial motion vectors. In some examples, the predetermined ordinal rank corresponds to a smallest index among the two or more indices of the two or more identical initial motion vectors. In some examples, the predetermined ordinal rank corresponds to a second-smallest index among the two or more indices of the two or more identical initial motion vectors. In yet some other examples, a predetermined portion of the set of initial motion vectors can be subject to refinement or free from refinement according a predetermine video coding standard for generating the encoded video data 102.

For example, according to an exemplary video coding standard, the MV R+S module 128 can create a set of initial motion vectors that includes two initial motion vectors:

$MVP_0$ associated with index 0 and $MVP_1$ associated with index 1. When the initial motion vectors $MVP_0$ and $MVP_1$ are different, according to the exemplary video coding standard, the MV R+S module 128 can refine both initial candidate motion vectors to become the set of candidate motion vectors $MVP_0'$ and $MVP_1'$. $MVP_0'$ and $MVP_1'$ are the refined counterparts of initial motion vectors $MVP_0$ and $MVP_1$, respectively. When the initial motion vectors $MVP_0$ and $MVP_1$ are the same, according to the exemplary video coding standard, the MV R+S module 128 can refine only one of the initial motion vectors. For example, the MV R+S module 128 can be configured to refine the initial candidate motion vector with the index 0, and the resulting set of candidate motion vectors would include $MVP_0'$ and $MVP_1$. Of course, the MV R+S module 128 can be alternatively configured refine the initial candidate motion vector with the index 1, and the resulting set of candidate motion vectors would include $MVP_0$ and $MVP_1'$.

Furthermore, for refining a particular initial motion vector, the MV R+S module 128 can refine the particular initial motion vector by identifying sample motion vectors based on the particular initial motion vector using a predetermined search pattern with a predetermined step size in a manner similar to those illustrated above performed by the MV S+R module 118 and is further illustrated with reference to FIGS. 2, 3A, and 3B. Of course, the particular initial motion vector can be refined based on other motion vector refinement approaches.

After the MV R+S module 128 determines the set of candidate motion vectors for the current block, the inter estimation module 121 may select one candidate motion vector from the set of candidate motion vectors, and the inter prediction module 122 can generate a corresponding predictor for the current block using the selected candidate motion vector. In some examples, when a refined motion vector in the set of candidate motion vectors is identical to a unrefined motion vector in the set of candidate motion vectors, the inter estimation module 121 can avoid using the refined motion vector in the set of candidate motion vectors. The inter predictor may be further used to generate residue information for the current block. The residue information and motion vector selection information may be encoded and included in the encoded video data 102 by the encoding controller 126.

FIG. 2 shows a diagram illustrating refining a motion vector 210 according to an exemplary embodiment of the disclosure. The motion vector 210 can correspond to a selected candidate motion vector subject to refinement as illustrated with reference to the decoding circuit 110, or a particular initial motion vector subject to refinement as illustrated with reference to the encoding circuit 120.

In FIG. 2, a current image 220 includes a current block 222. A motion vector 210 for the current block 222 identifies a reference block 262 in a reference image 260. In this example, the motion vector 210 identifies the reference block 262 by pointing to a particular position of the reference block 262, such as an upper-left corner of the reference block 262.

Moreover, according to a predetermined video coding standard, two template areas 224 and 226 associated with the current block 222 can be determined. The template area 224 can be defined as M rows of pixels immediately adjacent to an upper edge of the current block 222 in the current image 220. The template area 226 can be defined as N columns of pixels immediately to a left edge of the current block 222 in the current image 220. M and N are integers defined according to the predetermined video coding standard. Similarly, two template areas 264 and 266 associated with the reference block 262 can be determined. The template area 264 can be defined as M rows of pixels immediately adjacent to an upper edge of the reference block 262 in the reference image 260. The template area 266 can be defined as N columns of pixels immediately adjacent to a left edge of the reference block 266 in the reference image 262.

Also, a plurality of sample motion vectors can be identified using a predetermined search pattern. The sample motion vectors indicate corresponding upper left corners of sample blocks 270. Sample template areas for each sample block of the sample blocks 270 can be determined in a manner similar to the template areas 264 and 266 for the reference block 262. In some examples, the reference block 262 is one of the sample blocks 270. In some examples, images 220 and 260 are different images. In at least one example, images 220 and 260 can refer to the same image.

To refine the motion vector 210, template evaluations for the identified sample motion vectors can be performed based on determining template cost values for the corresponding template areas, where a template cost value is usable to measure a difference between the template areas 224 and 226 associated with the current block 222 and the corresponding template areas associated with a respective sample block indicated by a particular sample motion vector. The sample motion vector that corresponds to a least template cost value can be selected as a refinement of the motion vector 210, which can be output as the reconstructed motion vector or candidate motion vector, or can be used as the base motion vector for a next iteration of motion vector refinement.

Figure 3B:
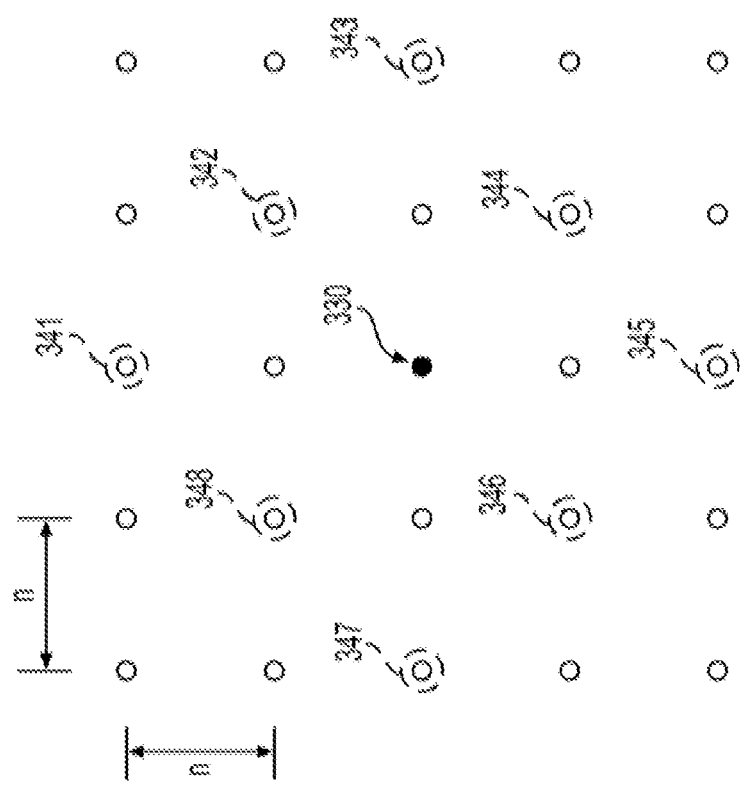
FIG. 3A and FIG. 3B show two exemplary search patterns for refining a motion vector according to an exemplary embodiment of the disclosure.
Figure 3A:
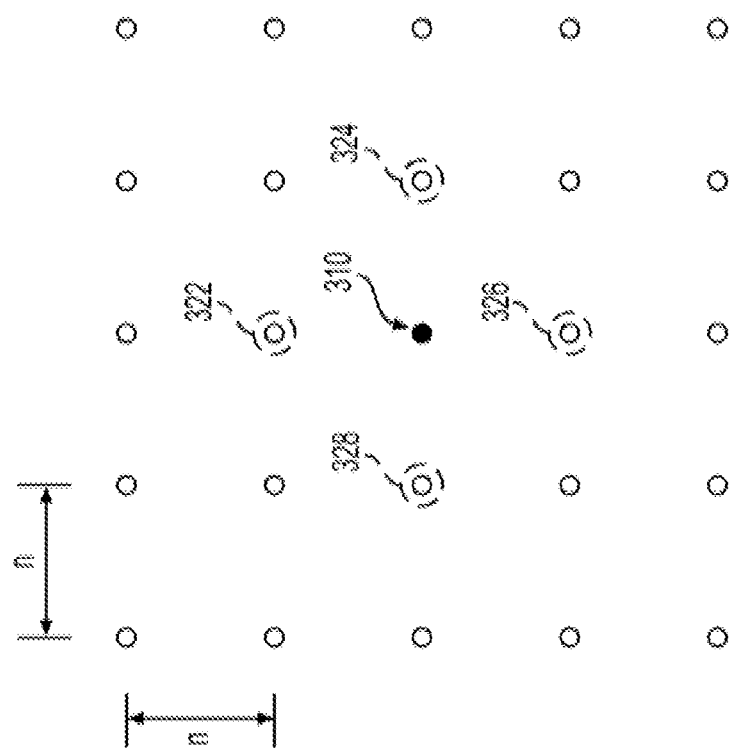

FIG. 3A shows an exemplary search pattern that is referred to as a cross search pattern according to an exemplary embodiment of the disclosure. Every unfilled dot in FIG. 3A corresponds to a possible upper-left corner of a sample block as illustrated with reference to FIG. 2. The filled dot 310 corresponds to an upper-left corner of a reference block indicated by a motion vector to be refined, such as the upper-left corner of the reference block 262 as illustrated with reference to FIG. 2.

As shown in FIG. 3A, sample motion vectors, or the corresponding sample motion blocks, can be selected based on a square pattern having corners defined as one step (1n) away from the upper-left corner 310 of the reference block, such as (0, 1) sample 322, (1, 0) sample 324, (0, −1) sample 326, and (−1, 0) sample 328, assuming the coordinate of the upper-left corner 310 is (0, 0). The step n can be defined in unit of pixel pitch of the current images or the reference image. In some examples, the step size n corresponds to an integer pixel pitch, such as one or two pixel pitches. In some examples, the step size n corresponds to a fractional pixel pitch, such as a quarter or a half of pixel pitch.

FIG. 3B shows another exemplary search pattern that is referred to as a diamond search pattern according to an exemplary embodiment of the disclosure. Similar to the example illustrated with reference to FIG. 3A, every unfilled dot in FIG. 3B corresponds to a possible upper-left corner of a sample block as illustrated with reference to FIG. 2. The filled dot 330 corresponds to an upper-left corner of a reference block indicated by a motion vector to be refined, such as the upper-left corner of the reference block 262 as illustrated with reference to FIG. 2.

As shown in FIG. 3B, sample motion vectors, or the corresponding sample motion blocks, can be selected based on a square pattern having corners defined as two steps (2n) away from the upper-left corner 330 of the reference block, such as corner samples including (0, 2) sample 341, (2, 0)

sample 343, (0, −2) sample 345, and (−2, 0) sample 347, as well as side samples including (1, 1) sample 342, (1, −1) sample 344, (−1, −1) sample 346, and (−1, 1) sample 348, assuming the coordinate of the upper-left corner 330 is (0, 0). The step n can be defined in unit of pixel pitch of the current images or the reference image. In some examples, the step size n corresponds to an integer pixel pitch, such as one or two pixel pitches. In some examples, the step size n corresponds to a fractional pixel pitch, such as a quarter or a half of pixel pitch.

Figure 4:
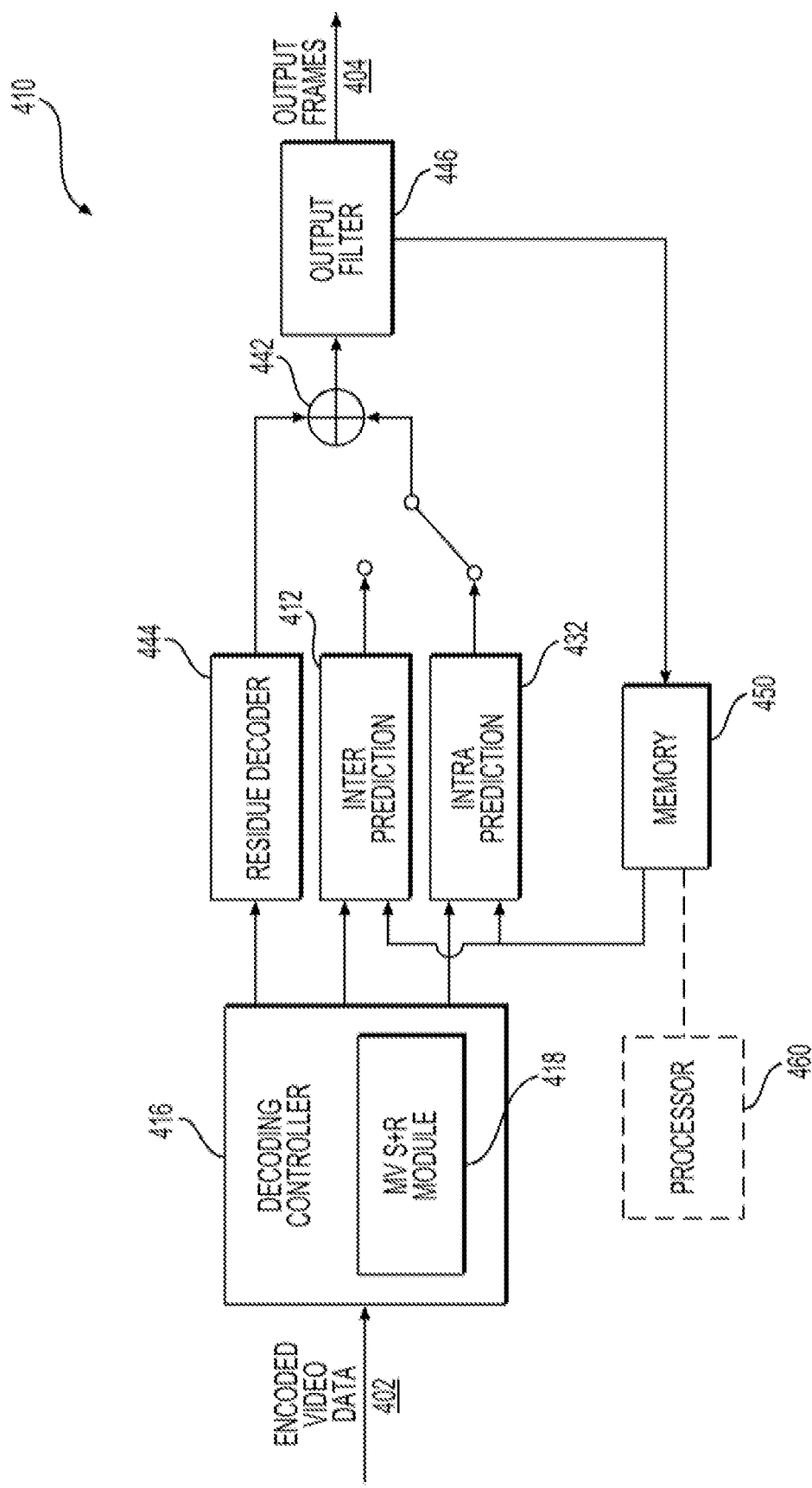
FIG. 4 shows an exemplary functional block diagram of a processing circuit for video decoding in the video coding system in FIG. 1 according to an embodiment of the disclosure.

FIG. 4 shows an exemplary functional block diagram of a processing circuit for video decoding 410 in a video coding system, such as the video coding system 100 in FIG. 1, according to an embodiment of the disclosure. FIG. 4 is a simplified illustration of the decoding circuit 410 and thus may not show all the details and variations of the decoding circuit 410.

The decoding circuit 410 includes an inter prediction module 412 and a decoding controller 416 with a motion vector select-and-refine (MV S+R) module 418, which may correspond to the inter prediction module 112, the decoding controller 116, and the MV S+R module 118 in FIG. 1, respectively. The inter prediction module 412 can generate a inter predictor of a current block based on a reconstructed motion vector provided by the MV S+R module 418 as described with reference to FIG. 1, if the decoding controller 416 determines that the predictor of the current block is to be generated using an inter prediction.

The decoding circuit 410 also includes an intra prediction module 432, an adder 442, a residue decoder 444, an output filter 446, a memory 450, and a processor 460. The intra prediction module 432 may generate an intra predictor of the current block based on specified or derived intra prediction mode when the current block is to be decoded using an intra prediction. Moreover, the residue decoder 444 can generate a residual portion of the current block according to the residue information from the decoding controller 416. The adder 442 may generate a decoded image of the current block (i.e., the decoded block) by adding the residual portion of the current block from the residue decoder 444, the inter predictor of the current block from the inter prediction module 412, and/or an intra predictor of the current block from the intra prediction module 432.

The output filter 446 can combine decoded blocks from the adder 442 into image frames, processes the image frames according to a predetermined filtering process, and output the filtered image frames as the output frames 404. The memory 450 can store filtered image frame from the output filter 446 and/or previously decoded blocks of a current frame from the prediction modules 412 or 432, which can be further used by the prediction modules 412 or 432 for retrieving reference samples.

The decoding controller 416 receives and analyzes the encoded video data 402 and extracts residue information and prediction parameters of the current block. The decoding controller 416 can provide the residue information to the residue decoder 444 and provide the prediction parameters to the inter prediction module 412 or the inter prediction module 432 in order to reconstruct the image of the current block. In particular, when the current block is to be decoded using the inter prediction, the MV S+R module 418 of the decoding controller 416 can determine a set of candidate motion vectors, select one of the candidate motion vectors according to a selection index, and refine the selected candidate motion vector to become a reconstructed motion vector when a predetermined condition is satisfied, as illustrated with reference to FIGS. 1-3B.

In operation, when a current block is to be decoded, the decoding controller 416 receives the encoded video data 402 associated with the current block and extracts information with respect to whether the current block is to be decoded using the inter prediction or the intra prediction. When the decoding controller 416 determines that the current block is to be decoded using the inter prediction, the MV S+R module 418 of the decoding controller 416 determines a reconstructed motion vector as illustrated above and forwards decoded prediction parameters of the current block, including the reconstructed motion vector, to the inter prediction module 412. The inter prediction module 412 may generate the inter predictor of the current block according to the reconstructed motion vector from the MV S+R module 418.

The decoding controller 416 also forwards the residue information to the residue decoder 444, where a residual portion of the current block is generated. The current block can now be decoded by adding the inter predictor from the inter prediction module 412 and the residual portion of the current block from the residue decoder 444 at the adder 442.

The memory 450 can be used to store the program instructions, information corresponding to the prediction parameters, previously decoded blocks, output frames, and/or intermediate data for performing various functions of the decoding circuit 410. In some examples, the memory 450 includes a non-transitory computer readable medium, such as a semiconductor or solid-state memory, a random access memory (RAM), a read-only memory (ROM), a hard disk, an optical disk, or other suitable storage medium. In some embodiments, the memory 450 includes a combination of two or more of the non-transitory computer readable mediums listed above.

Moreover, as shown in FIG. 4, the processor 460 is electrically coupled with the memory 450 and can be configured to execute program instructions stored in the memory 450 to perform various functions. The processor 460 can include a single or multiple processing cores. Various components of the decoding circuit 410, such as the decoding controller 416, MV S+R module 418, inter prediction module 412, intra prediction module 432, adder 442, residue decoder 444, and/or output filter 446, may be implemented in whole or in part by hardware components, the processor 460 executing the program instructions, or a combination thereof. Of course, the processor 460 can also execute program instructions to control receiving of the encoded video data 402 and the output or display of the output frames 404. In some examples, the processor 460 can execute program instructions to perform functions that may not be directly related to decoding the encoded video data 402.

Figure 5:
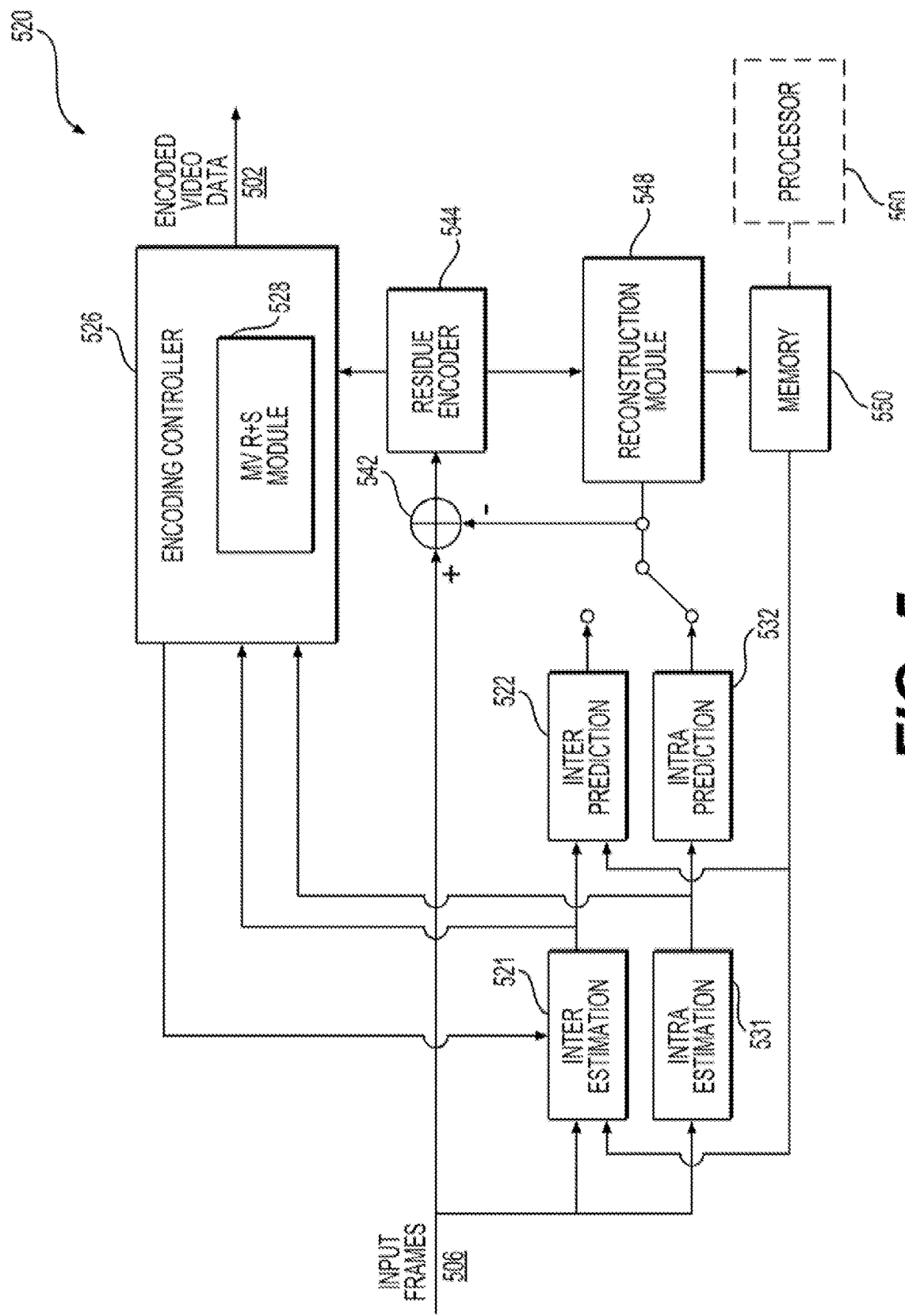
FIG. 5 shows an exemplary functional block diagram of a processing circuit for video encoding in the video coding system in FIG. 1 according to an embodiment of the disclosure.

FIG. 5 shows an exemplary functional block diagram of a processing circuit for video encoding 520 in a video coding system, such as the video coding system 100 in FIG. 1, according to an embodiment of the disclosure. FIG. 5 is a simplified illustration of the encoding circuit 520 and thus may not show all the details and variations of the encoding circuit 520.

The encoding circuit 520 includes an inter estimation module 521, an inter prediction module 522, and an encoding controller 526 with a motion vector refine-and-select (MV R+S) module 528, which may correspond to the inter estimation module 121, inter prediction module 122, encoding controller 126, and motion vector refine-and-select (MV R+S) module 128 in FIG. 1, respectively. The encoding circuit 520 also includes an intra estimation module 531, an intra prediction module 532, an adder 542, a residue encoder 544, a reconstruction module 548, a memory 550, and a processor 560.

The encoding controller 526 supervises the operation of the inter estimation module 521, inter prediction module 522, intra estimation module 531, and intra prediction module 532. The encoding controller 526 may divide each input frame into blocks and instruct the inter estimation module 621 and/or intra estimation module 531 to determine the prediction scheme, prediction mode, and/or corresponding prediction parameters for each block. The encoding controller 526 can select one of the inter prediction module 522 or intra prediction module 532 to output a corresponding final predictor of a current block to the adder 542. The adder 542 receives an original image of the current block and the final predictor of the current block and outputs a residual portion of the current block by subtracting the final predictor from the original image of the current block. The residue encoder 544 receives and encodes the residual portion of the current block. The encoding controller 526 may generate the encoded video data 502 based on the prediction parameters from the inter estimation module 521 and/or intra estimation module 531 and the output from the residue encoder 544.

The inter prediction module 522 and intra prediction module 532 may receive prediction parameters from the inter estimation module 521 and intra estimation module 531, respectively, and may generate corresponding final predictors for the current block in a manner similar to the operations of the inter prediction module 412 and intra prediction module 432 in FIG. 4. The inter prediction module 522 and/or intra prediction module 532 may generate the final predictor in a manner similar to the operation of the inter prediction module 412 and the intra prediction module 432, respectively. Therefore, detailed description thereof is omitted.

In some examples, the encoding controller 526 may control the inter estimation module 521, intra estimation module 531, inter prediction module 522, intra prediction module 532, and/or the residue encoder 544 to encode the current block based on different prediction schemes and parameters and then may select an optimal combination of encoding scheme and parameters for encoding the current block.

In some examples, when determining possible prediction parameters using the inter estimation module 521, the MV R+S module 528 of the encoding controller 526 can determine initial motion vectors for a current block and determine a set of candidate motion vectors for the current block by refining initial motion vectors that satisfy a predetermined condition as illustrated with reference to FIGS. 1-3B.

The reconstruction module 548 may receive the final predictor from the inter prediction module 522 or intra prediction module 532 and a reconstructed residual portion of the current block from the residue encoder 544. Based on such information, the reconstruction module 448 may generate a reconstructed image of the current block and/or reconstructed frames in a manner similar to the operations of the adder 442 and the output filter 446 in FIG. 4. The reconstructed blocks and/or frames can be stored in the memory 550 and are accessible by the inter prediction module 522, intra prediction module 532, inter estimation module 521, and/or intra estimation module 531 for estimating prediction parameters for the current block or a next block.

In operation, when a current block is to be encoded using intra prediction as instructed by the encoding controller 526, the inter estimation module 521 receives the original image of the current block from the input frames 506. The inter estimation module 521 can work with the MV R+S module 528 of the encoding controller 526 to determine suitable prediction parameters, such as receiving a set of candidate motion vectors determined by the MV R+S module 528 and selecting a motion vector from the set of candidate motion vectors for the current block according to a predetermined video coding standard. The inter prediction module 522 may generate an inter predictor of the current block based on the prediction parameters, such as a selected motion vector, provide by the inter estimation module 524.

The adder 542 may output a residual portion of the current block based on the original image of the current block and the final predictor and encoded the residual portion. The encoding controller 526 may collect the prediction parameters from the inter estimation module 521 and/or intra estimation module 531 and the encoded residual information and determine whether the selected coding scheme for the current block is acceptable.

The memory 550 can be used to store the program instructions, information corresponding to the prediction parameters, reconstructed blocks, input frames, and/or intermediate data for performing various functions of the encoding circuit 520. In some examples, the memory 550 includes a non-transitory computer readable medium, such as a semiconductor or solid-state memory, a random access memory (RAM), a read-only memory (ROM), a hard disk, an optical disk, or other suitable storage medium. In some embodiments, the memory 550 includes a combination of two or more of the non-transitory computer readable mediums listed above.

Moreover, as shown in FIG. 5, the processor 560 is electrically coupled with the memory 550 and can be configured to execute program instructions stored in the memory 550 to perform various functions. The processor 560 can include a single or multiple processing cores. Various components of the encoding circuit 520, such as the encoding controller 526, MV R+S module 528, inter prediction module 522, inter estimation module 521, intra prediction module 532, intra estimation module 531, adder 542, residue encoder 544, and/or reconstruction module 548, may be implemented in whole or in part by hardware components, the processor 560 executing the program instructions, or a combination thereof. Of course, the processor 560 can also execute program instructions to control receiving of the input frames 506 and the output of the encoded video data 502. In some examples, the processor 560 can execute program instructions to perform functions that may not be directly related to encoding the encoded video data 502.

Moreover, the decoding circuit 410 in FIG. 4 and the encoding circuit 520 in FIG. 5 may be implemented in the same electronic device, and various components of the decoding circuit 410 and the encoding circuit 520 may be shared or reused. For example, one or more of the memory 450, processor 460, MV S+R module 418, inter prediction module 412, intra prediction module 432, and output filter 546 in the decoding circuit 410 may also be used to function as the memory 550, processor 560, inter prediction module 522, intra prediction module 532, MV R+S module 518, and reconstruction module 548 in FIG. 5, respectively.

Figure 6:
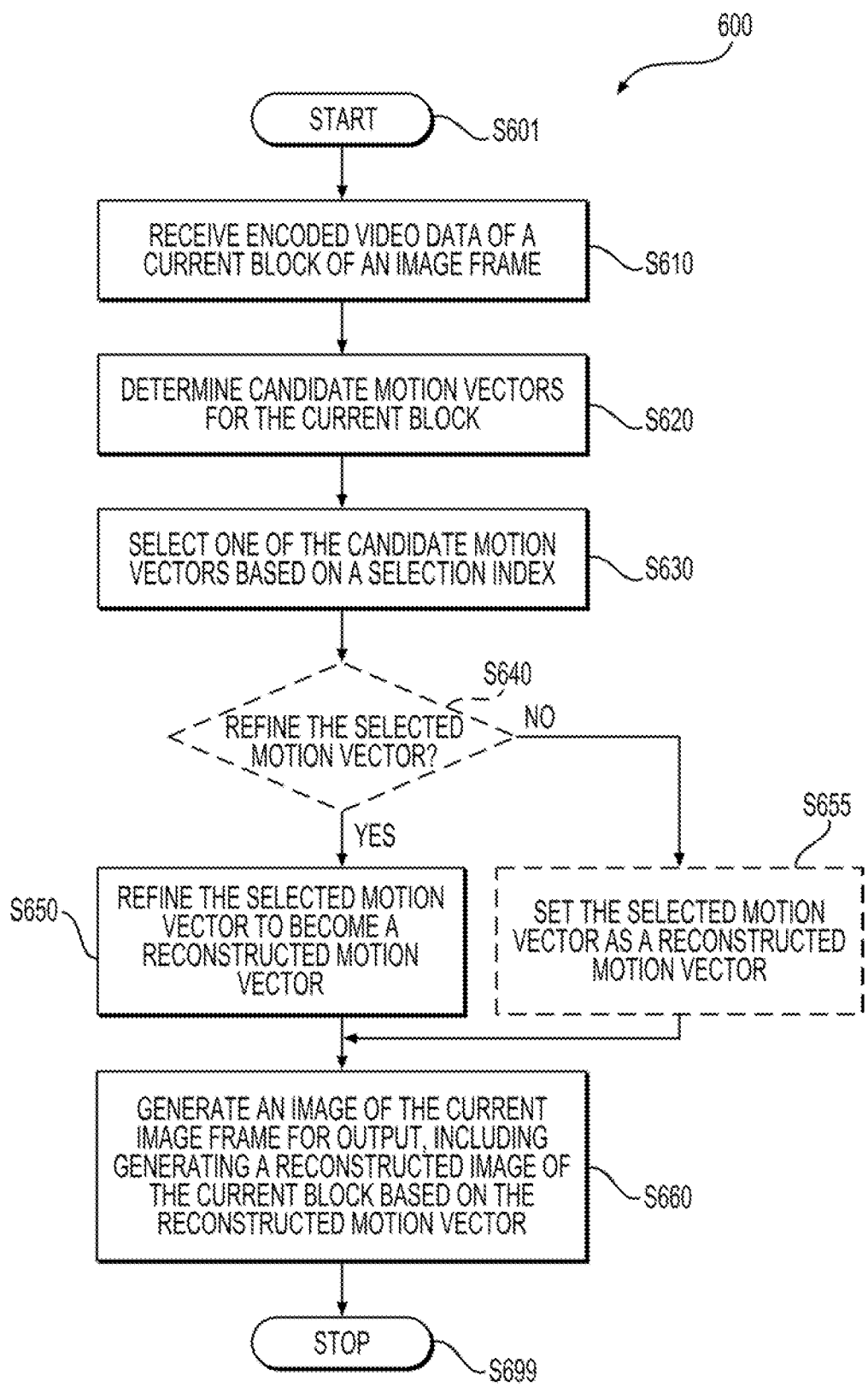
FIG. 6 shows a flow chart outlining an exemplary video decoding process using a processing circuit for video decoding, such as the processing circuit in FIG. 4, according to an embodiment of the disclosure.

FIG. 6 shows a flow chart outlining an exemplary video decoding process 600 using a processing circuit for video decoding, such as the processing circuit 410 in FIG. 4, according to an embodiment of the disclosure. It is understood that additional operations may be performed before, during, and/or after the process 600 depicted in FIG. 6. The process 600 starts at S601 and proceeds to S610.

At S610, encoded video data associated with a current block in an image frame are received as input data. For example, the decoding controller 416 may receive the encoded video data 402 that includes the input data associated with the current block.

At S620, when the current block is encoded using an inter prediction, a set of candidate motion vectors for the current block is determined. For example, the MV S+R module 418 can determine a set of candidate motion vectors based on at least one spatially adjacent block and/or at least one temporally adjacent block of the current block. The MV S+R module 418 can determine a set of candidate motion vectors according to a predetermined motion vector prediction process, such as an Advanced Motion Vector Prediction (AMVP) mode or a Merge mode, or any other suitable motion vector prediction process.

At S630, one of the candidate motion vectors is selected based on a selection index. In some examples, the selection index is explicitly provided in the received encoded video data. In some examples, the selection index can be derived and thus does not have to be explicitly provided in the received encoded video data. For example, the decoding controller 416 can determine a selection index and select one of the set of candidate motion vector according to the selection index.

At S640, whether the selected candidate motion vector is subject to further refinement is determined based on whether the selected candidate motion vector meets a predetermined condition. If the selected candidate motion vector meets is to be refined, the process proceeds to S650; otherwise, the process proceeds to S655.

In some examples, the set of candidate motion vectors includes two or more identical candidate motion vectors that correspond to two or more respective indices. The selected candidate motion vector can be determined as subject to further refinement when the selection index corresponds to a predetermined ordinal rank among the two or more indices of the two or more identical candidate motion vectors. In some examples, the predetermined ordinal rank corresponds to a smallest index among the two or more indices of the two or more identical candidate motion vectors. In some examples, the predetermined ordinal rank corresponds to a second-smallest index among the two or more indices of the two or more identical candidate motion vectors.

In yet some examples, the selected candidate motion vector can always be refined. In such scenario, the process can proceeds directly from S630 to S650, and S640 and S655 can be omitted.

For example, the MV S+R module 118 or 418 can determine whether the selected candidate motion vector is subject to further refinement as illustrated with reference to FIGS. 1-4.

At S650, the selected motion vector is refined to become a reconstructed motion vector for the current block. In some examples, refining the selected motion vector includes identifying sample motion vectors based on the selected candidate motion vector using a diamond search pattern or a cross search pattern, performing template evaluations for the identified sample motion vectors, and selecting one of the identified sample motion vectors as a refinement of the selected candidate motion vector based on the template evaluations. In some examples, the identified sample motion vectors indicate reference positions in a reference image that are within a predetermined search range from a reference position indicated by the selected candidate motion vector. For example, the MV S+R module 118 or 418 can refine the selected candidate motion vector as illustrated with references to FIGS. 1-4.

At S655, the selected candidate motion vector can be used as the reconstructed motion vector without refinement.

At S660, an image of the current frame is generated for output, including generating a reconstructed image of the current block based on the reconstructed motion vector as determined at S650 or S655. For example, the decoding controller 416 can control the residue decoder 444 to generate a residue portion of the current block, the inter prediction module 412 to generate the predictor of the current block based on the reconstructed motion vector, and the adder 442 to combine the predictor and the residue portion to generate the reconstructed motion of the current block. The decoding controller 416 can control the decoding of the encoded video data to generate output frames accordingly as illustrated with reference to FIGS. 1-4.

After S660, the process proceeds to S699 and terminates.

Figure 7:
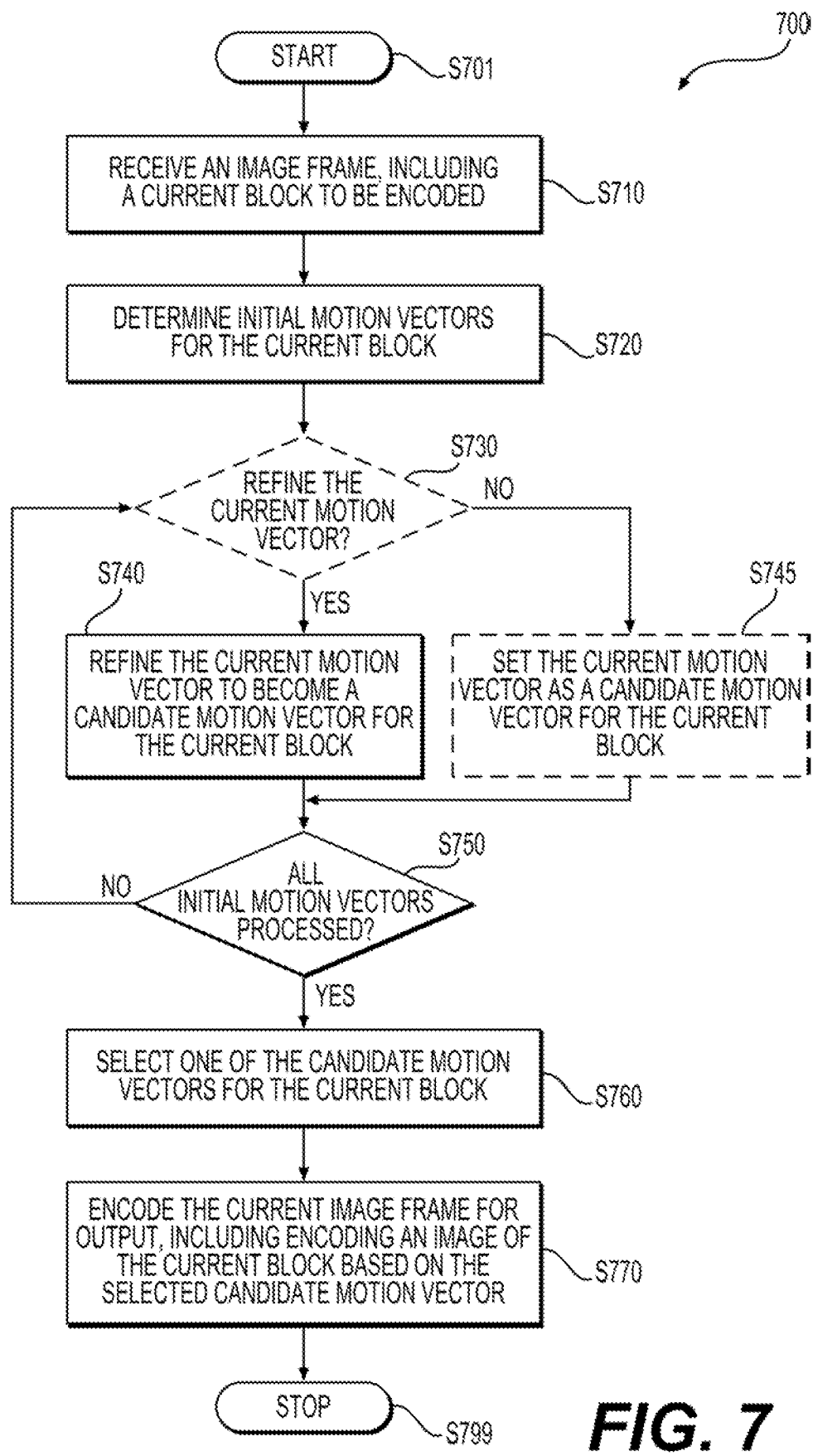
FIG. 7 shows a flow chart outlining an exemplary video encoding process using a processing circuit for video encoding, such as the processing circuit in FIG. 5, according to an embodiment of the disclosure.

FIG. 7 shows a flow chart outlining an exemplary video encoding process 700 using a processing circuit for video encoding, such as the processing circuit 520 in FIG. 5, according to an embodiment of the disclosure. It is understood that additional operations may be performed before, during, and/or after the process 700 depicted in FIG. 7. The process 700 starts at S701 and proceeds to S710.

At S710, an input image frame including a current block to be encoded using an inter prediction is received as input data. For example, the processing circuit 520 may receive the input frames 506 that include the image frame having the current block.

At S720, a set of initial motion vectors for the current block is determined. For example, the MV R+S module 528 can determine a set of initial motion vectors based on at least one spatially adjacent block and/or at least one temporally adjacent block of the current block. The MV R+S module 528 can determine a set of initial motion vectors according to a predetermined motion vector prediction process, such as an Advanced Motion Vector Prediction (AMVP) mode or a Merge mode, or any other suitable motion vector prediction process.

At S730, for each initial motion vector, whether the initial candidate motion vector is subject to further refinement is determined based on whether the initial candidate motion vector meets a predetermined condition. If the initial candidate motion vector meets is to be refined, the process proceeds to S740; otherwise, the process proceeds to S745.

In some examples, the set of initial motion vectors includes two or more identical candidate motion vectors that correspond to two or more respective indices. The initial candidate motion vector can be determined as subject to further refinement when the index corresponds to a predetermined ordinal rank among the two or more indices of the two or more identical initial motion vectors. In some examples, the predetermined ordinal rank corresponds to a smallest index among the two or more indices of the two or more identical candidate motion vectors. In some examples, the predetermined ordinal rank corresponds to a second-smallest index among the two or more indices of the two or more identical candidate motion vectors.

In yet some examples, the initial candidate motion vector can always be refined. In such scenario, the process can proceeds directly from S720 to S740, and S730 and S745 can be omitted.

For example, the MV R+S module 128 or 528 can determine whether the selected candidate motion vector is subject to further refinement as illustrated with reference to FIGS. 1-3B and 5.

At S740, the initial motion vector is refined to become a corresponding candidate motion vector for the current block that is associated with the same selectin index as the currently-processed initial motion vector. In some examples, refining the initial motion vector includes identifying sample motion vectors based on the initial motion vector using a diamond search pattern or a cross search pattern, performing template evaluations for the identified sample motion vectors, and selecting one of the identified sample motion vectors as a refinement of the initial motion vector based on the template evaluations. In some examples, the identified sample motion vectors indicate reference positions in a reference image that are within a predetermined search range from a reference position indicated by the initial motion vector. For example, the MV R+S module 128 or 528 can refine the initial motion vector as illustrated with references to FIGS. 1-3B and 5.

At S745, the initial motion vector can be used as the corresponding candidate motion vector that is associated with the same selectin index as the currently-processed initial motion vector without refinement.

At S750, whether all initial motion vectors are processed is determined. If all initial motion vectors have been processed according to S730. S740, and/or S745, the process proceeds to S760; otherwise, the process proceeds to S730 or to S740 in a case that S730 is omitted.

At S760, one of the candidate motion vector is selected for encoding the current block using the inter prediction. For example, the encoding controller 526 and/or the inter estimation module 521 can determine which candidate motion vector is to be selected for the current block. A corresponding selection index may be identified for further encoding process.

At S770, a current image frame is encoded for output, including encoding an image of the current block based on the selected candidate motion vector. In some examples, the image of the current block can be divided into an intra predictor to be encoded using the selected candidate motion vector and a residue portion. The encoding controller can further include the selection index for indicating the selected candidate motion vector into the encoded video data.

For example, the encoding controller 526 can control the inter prediction module 522 to generate an inter predictor for the current block, the adder 542 to generate a residue portion of the current block based on subtracting the intra predictor from an original image of the current block, and the residue encoder 544 to encode the residue portion. The encoding controller 526 can collect the selection index and the encoded residue portion and incorporate such information in the encoded video data according to a predetermined video coding standard as illustrated with reference to FIGS. 1-3B and 5.

After S760, the process proceeds to S799 and terminates.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A video decoding device, comprising:
a processing circuit configured to:
receive encoded video data associated with a current block of a current image frame;
determine a set of candidate motion vectors for the current block;
determine a selection index based on the encoded video data;
select one of the set of candidate motion vectors based on the selection index;
determine a reconstructed motion vector according to the selected candidate motion vector, including,
when the set of candidate motion vectors includes two or more identical candidate motion vectors that correspond to two or more respective indices and the selection index corresponds to a predetermined ordinal rank among the two or more indices of the two or more identical candidate motion vectors, refining the selected candidate motion vector to become the reconstructed motion vector; and
generate an image of the current image frame for output, including generating a reconstructed image of the current block based on the reconstructed motion vector.

2. The video decoding device according to claim 1, wherein the predetermined ordinal rank corresponds to a smallest index among the two or more indices of the two or more identical candidate motion vectors.

3. The video decoding device according to claim 1, wherein the predetermined ordinal rank corresponds to a second-smallest index among the two or more indices of the two or more identical candidate motion vectors.

4. The video decoding device according to claim 1, wherein the processing circuit is further configured to:
determine the reconstructed motion vector without performing the refining the selected candidate motion vector when the selection index does not correspond to the predetermined ordinal rank.

5. The video decoding device according to claim 1, wherein the processing circuit is configured to perform the refining the selected candidate motion vector to become the reconstructed motion vector when the selected candidate motion vector is different from any other motion vector of the set of candidate motion vectors.

6. The video decoding device according to claim 1, wherein the processing circuit is configured to determine the set of candidate motion vectors for the current block based on motion information of at least one spatially adjacent block and/or at least one temporally adjacent block of the current block.

7. The video decoding device according to claim 6, wherein the set of candidate motion vectors includes at most two candidate motion vectors.

8. The video decoding device according to claim 1, wherein the processing circuit is configured to perform the refining the selected candidate motion vector by
identifying sample motion vectors based on the selected candidate motion vector using a diamond search pattern or a cross search pattern,
performing template evaluations for the identified sample motion vectors, and
selecting one of the identified sample motion vectors as a refinement of the selected candidate motion vector based on the template evaluations.

9. The video decoding device according to claim 8, wherein the identified sample motion vectors indicate reference positions in a reference image that are within a predetermined search range from a reference position indicated by the selected candidate motion vector.

10. A video decoding method, comprising:
receiving encoded video data associated with a current block of a current image frame;
determining a set of candidate motion vectors for the current block;
determining a selection index based on the encoded video data;
selecting one of the set of candidate motion vectors based on the selection index;
determining a reconstructed motion vector according to the selected candidate motion vector, including,
when the set of candidate motion vectors includes two or more identical candidate motion vectors that correspond to two or more respective indices and the selection index corresponds to a predetermined ordinal rank among the two or more indices of the two or more identical candidate motion vectors, refining, by a processing circuit, the selected candidate motion vector to become the reconstructed motion vector; and
generating, by a processing circuit, an image of the current image frame for output, including generating a reconstructed image of the current block based on the reconstructed motion vector.

11. A video encoding device, comprising:
a processing circuit configured to:
receive a current image frame that includes a current block;
determine a set of initial motion vectors for the current block;
determine a set of candidate motion vectors for the current block based on the set of initial motion vectors, including,
when the set of initial motion vectors includes two or more identical initial motion vectors that correspond to two or more respective indices,
refining one of the two or more identical initial motion vectors that corresponds to a predetermined ordinal rank among the two or more indices of the two or more identical initial motion vectors to become a first candidate motion vector, and
using another one of the two or more identical initial motion vectors as a second candidate motion vector;
select a candidate motion vector from the set of candidate motion vectors for the current block; and
encode the current image frame for output, including encoding an image of the current block based on the selected candidate motion vector.

12. The video encoding device according to claim 11, wherein the predetermined ordinal rank corresponds to a smallest index among the two or more indices of the two or more identical initial motion vectors.

13. The video encoding device according to claim 11, wherein the predetermined ordinal rank corresponds to a second-smallest index among the two or more indices of the two or more identical initial motion vectors.

14. The video encoding device according to claim 11, wherein the processing circuit is further configured to:
refine each initial motion vector when all of the one or more initial motion vectors are different.

15. The video encoding device according to claim 11, wherein the processing circuit is configured to determine the set of initial motion vectors for the current block based on motion information of at least one spatially adjacent block and/or at least one temporally adjacent block of the current block.

16. The video encoding device according to claim 15, wherein the set of initial motion vectors includes at most two initial motion vectors.

17. The video encoding device according to claim 11, wherein the processing circuit is configured to perform refining a particular initial motion vector by
identifying sample motion vectors based on the particular initial motion vector using a diamond search pattern or a cross search pattern,
performing template evaluations for the identified sample motion vectors, and
selecting one of the identified sample motion vectors as a refinement of the particular initial motion vector based on the template evaluations.

18. The video encoding device according to claim 17, wherein the identified sample motion vectors indicate reference positions in a reference image that are within a predetermined search range from a reference position indicated by the selected candidate motion vector.

19. A video encoding method, comprising:
receiving a current image frame that includes a current block;
determining a set of initial motion vectors for the current block;
determining, by a processing circuit, a set of candidate motion vectors for the current block based on the set of initial motion vectors, including
when the set of initial motion vectors includes two or more identical initial motion vectors that correspond to two or more respective indices,
refining one of the two or more identical initial motion vectors that corresponds to a predetermined ordinal rank among the two or more indices of the two or more identical initial motion vectors to become a first candidate motion vector, and
using another one of the two or more identical initial motion vectors as a second candidate motion vector;
selecting a candidate motion vector from the set of candidate motion vectors for the current block; and
encoding, by the processing circuit, the current image frame for output, including encoding an image of the current block based on the selected candidate motion vector.

* * * * *